S. DILDAY.
SWEET POTATO DIGGER.
APPLICATION FILED JAN. 10, 1916.
1,203,713.
Patented Nov. 7, 1916.
2 SHEETS—SHEET 2.
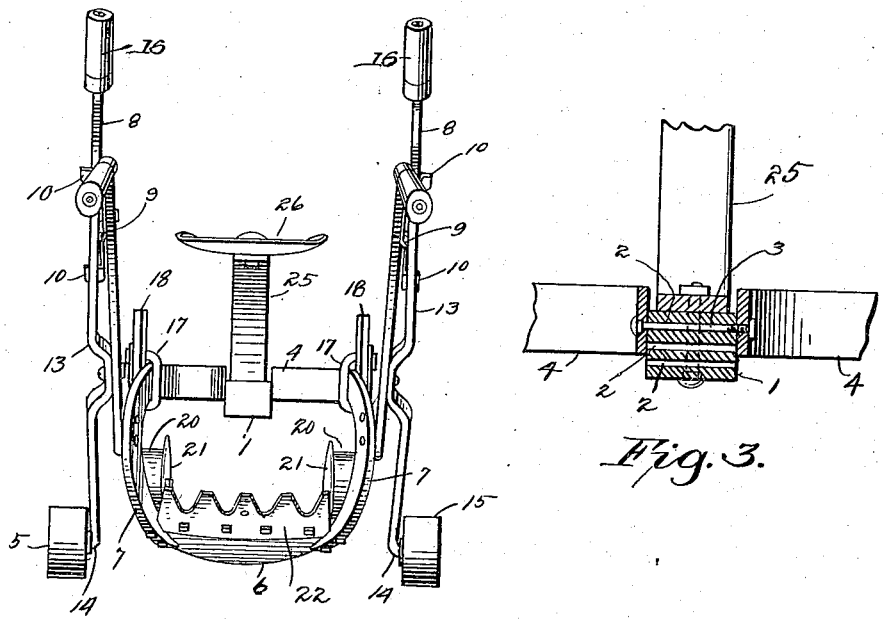
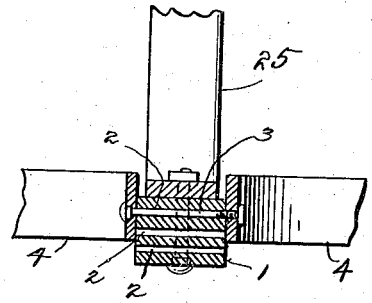
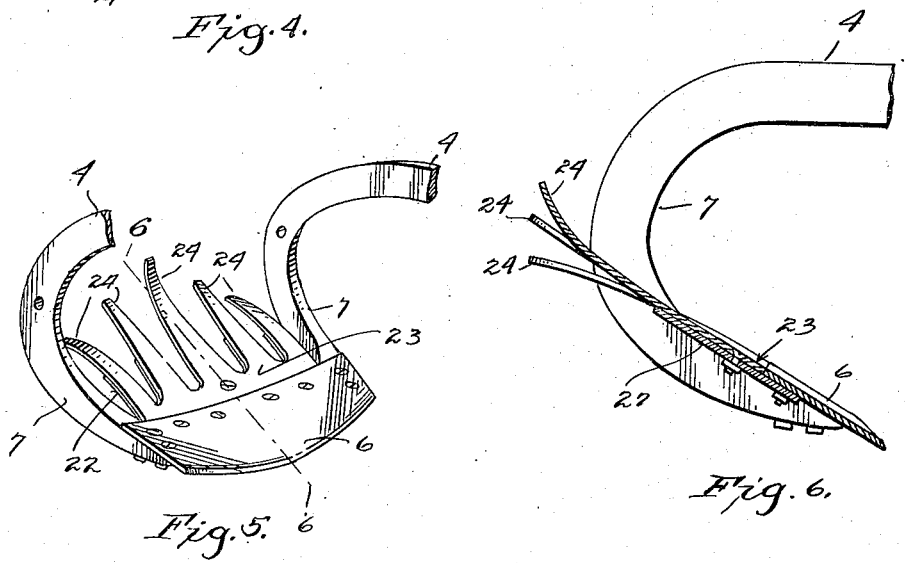

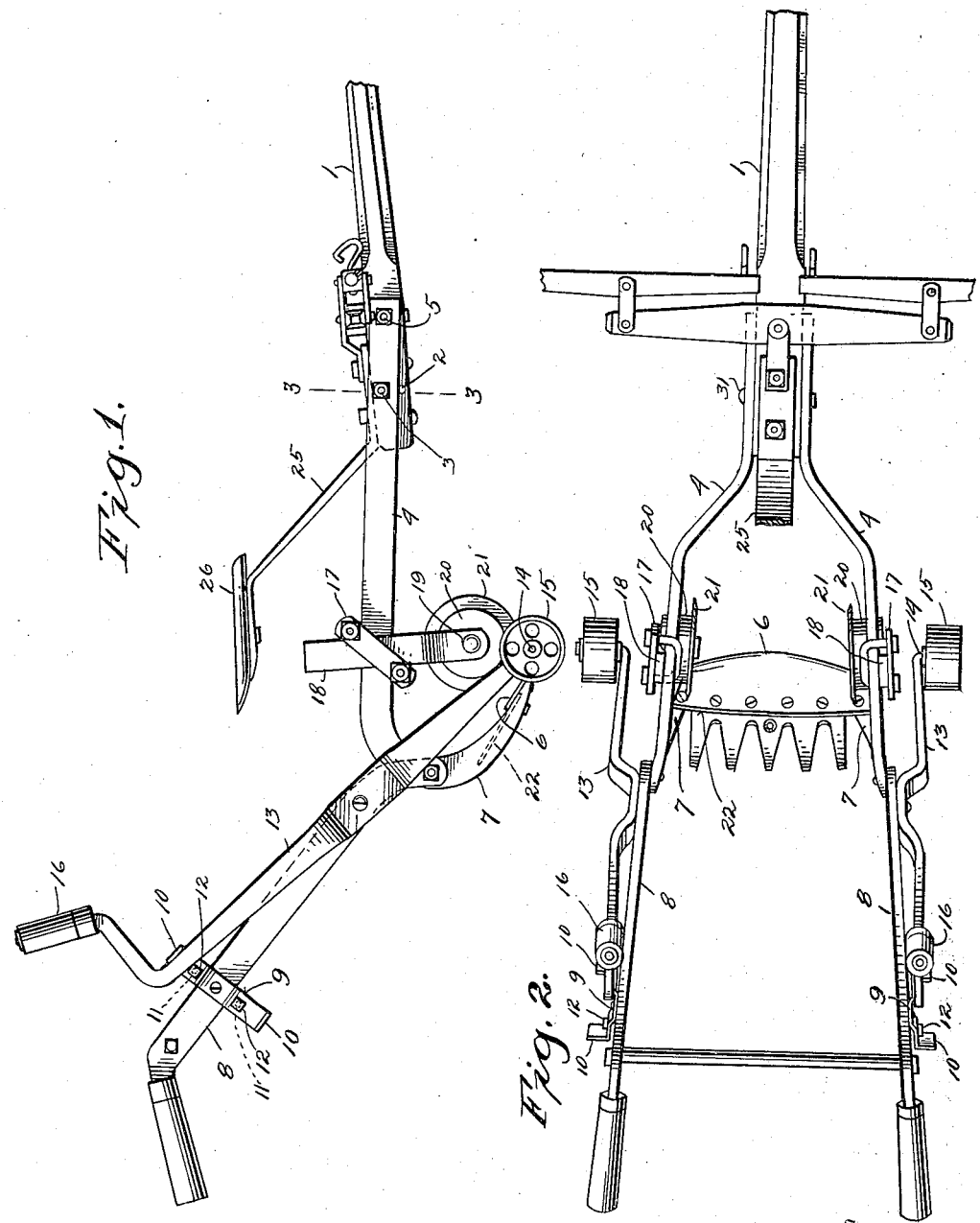

UNITED STATES PATENT OFFICE.

SIMEON DILDAY, OF MARISSA, ILLINOIS.

SWEET-POTATO DIGGER.

1,203,713.  Specification of Letters Patent.  Patented Nov. 7, 1916.

Application filed January 10, 1916. Serial No. 71,300.

*To all whom it may concern:*

Be it known that I, SIMEON DILDAY, a citizen of the United States, residing at Marissa, in the county of St. Clair, State of Illinois, have invented certain new and useful Improvements in Sweet-Potato Diggers; and I do hereby declare the following to be a full, clear, and exact description of the invention, such as will enable others skilled in the art to which it appertains to make and use the same.

The present invention is directed to improvements in sweet potato diggers, and has for its object to so construct a device of this character that the same will effectually dig the potatoes as the device is moved across the field.

A further object of the invention is to provide a digger so constructed that the cutting depth of the digging blade can be regulated.

A still further object of the invention is to provide a device of this character with wheels capable of being lowered when it is desired to move the device from one field to another, said wheels being adapted to be conveniently elevated when it is desired to use the device.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a top plan view. Fig. 3 is a sectional view on line 3—3 of Fig. 1. Fig. 4 is a rear view. Fig. 5 is a perspective view of the blades, showing the same equipped with the attachment for digging Irish potatoes. Fig. 6 is a sectional view on line 6—6 of Fig. 5.

Referring to the drawing 1 indicates the tongue, said tongue being provided adjacent its rear end with vertically spaced openings 2 which are adapted to selectively engage the bolt 3 which is passed through the gage beams 4, said beams having their forward ends pivotally connected to the tongue by a bolt 5. By providing the openings 2 it is obvious that the angular relation between the beams 4 and tongue can be changed, whereby the angle of the blade 6 can be adjusted, said blade having its ends fixed to the lower ends of the downwardly turned portions 7 of said beams.

Having their lower ends fixed to the beams 4 are handles 8, said handles having fixed thereto plates 9, said plates having their ends terminating in outwardly directed flanges 10. Bolts 11 are carried by the plates and have engaged on their outer ends nuts 12, said nuts being spaced and disposed adjacent the ends of the plates, the purpose of which will appear later. Pivotally connected to the handles 8 are levers 13, the lower ends of which are provided with axles 14 on which are rotatably mounted wheels 15. The upper ends of the levers are provided with handles 16, whereby the levers can be shifted so as to raise or lower the wheels 15. To hold the levers. with the wheels in their lowered position, it is only necessary to shift the levers so that the same will engage over the uppermost nuts 12, and when the levers are in this position the blade 6 will be elevated so that the digger can be moved from place to place. To hold the wheels in their raised position, the levers are engaged under the lowermost nuts 12.

The beams 4 have mounted thereon clamps 17 which are engaged by the arms 18, said arms having axles 19 carried by their lower ends and rotatably mounted on these axles are rollers 20, said rollers having comparatively wide treads so that the same will not sink in the earth under the weight of the device. The inner faces of the rollers 20 have fixed thereto cutting disks 21 which are greater in diameter than the rollers whereby the disks will cut the vines as the device is in operation, and in advance of the blade 6. It is obvious that the arms can be adjusted vertically so as to regulate the cutting action of the blade 6.

As the device is drawn along the row of potatoes the blade, which is arranged in an inclined position, will cut the vines and permit the potatoes to be discharged over the upper edge of the blade and toothed bar 22, after which they can be gathered.

As shown in Figs. 5 and 6, the attachment consists of a bar 23 which is bolted to the bar 22 and has a plurality of tapered fingers 24, which will permit the dirt to pass therebetween while. the potatoes will pass thereover, and lie upon the earth, and exposed in a straight line rearwardly of the blade, said attachment only being used when the device is employed for digging Irish potatoes. It will be noted that the central finger 24 is curved upwardly, while the outermost fingers are curved downwardly, and that the fingers between the outermost and central fingers are substantially straight. Thus the Irish potatoes are sifted before falling to the earth, or in other words the earth will pass between the fingers before the potatoes pass over the ends thereof.

Mounted on the extreme rear end of the tongue 1 is a bar 25 which has fixed to its upper end a driver's seat 26.

What is claimed is:—

A device of the class described, comprising a pair of beams, a tongue having its rear end attached between the beams, said beams having their rear ends terminating in downwardly curved portions, a cutting blade having its ends connected to the lower ends of said portions, handles fixed to the beams, levers pivotally connected to the handles and having wheels rotatably connected at their lower ends, plates carried by the handles and having nuts mounted thereon, said levers being adapted to engage selected nuts to hold the wheels in raised or lowered positions.

In testimony whereof, I affix my signature, in the presence of two witnesses.

SIMEON DILDAY.

Witnesses:
B. M. TOWNS,
JAMES MCGONEGAL.

Copies of this patent may be obtained for five cents each, by addressing the "Commissioner of Patents, Washington, D. C."